United States Patent
Kim (10) Patent No.: US 9,656,573 B2
(45) Date of Patent: May 23, 2017

(54) METHOD AND DEVICE FOR SENSORY CONTROL OF HYBRID OPERATION MACHINE

(71) Applicant: VOLVO CONSTRUCTION EQUIPMENT AB, Eskilstuna (SE)

(72) Inventor: Chong-Chul Kim, Seoul (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/917,999

(22) PCT Filed: Sep. 10, 2013

(86) PCT No.: PCT/KR2013/008174
§ 371 (c)(1),
(2) Date: Mar. 10, 2016

(87) PCT Pub. No.: WO2015/037751
PCT Pub. Date: Mar. 19, 2015

(65) Prior Publication Data
US 2016/0221466 A1 Aug. 4, 2016

(51) Int. Cl.
*G06F 17/00* (2006.01)
*B60L 15/20* (2006.01)
(Continued)

(52) U.S. Cl.
CPC .............. *B60L 15/20* (2013.01); *B60L 7/10* (2013.01); *B60W 10/08* (2013.01); *B60W 20/00* (2013.01);
(Continued)

(58) Field of Classification Search
CPC ........... B60L 15/20; B60L 7/10; B60W 10/08; B60W 20/00; B60W 2510/081; B60W 2510/082; Y02T 10/2258; Y10S 903/905
(Continued)

(56) References Cited

U.S. PATENT DOCUMENTS 6,302,823 B1 10/2001 Eckert et al.
6,371,885 B1 4/2002 Kobayashi et al.
(Continued)

FOREIGN PATENT DOCUMENTS

JP 2000337490 A 12/2000
JP 2002213266 A 7/2002
(Continued)

OTHER PUBLICATIONS

Stewart et al., Generator Voltage Stabilisation for the Series Hybrid Vehicle, 2007, IEEE p. 274-279.*
(Continued)

*Primary Examiner* — McDieunel Marc
(74) *Attorney, Agent, or Firm* — Harness, Dickey & Pierce, P.L.C.

(57) ABSTRACT

A hybrid operation machine of which an electric motor is driven by at least one among a power generator driven by an engine and an energy storage system for storing regenerative energy, and comprising: a motor drive for driving the electric motor; an acceleration sensor for sensing an accelerator pedal command; and a control unit for mapping the accelerator pedal command to a speed command during a low speed traveling operation and controlling a traveling unit through the motor drive, wherein the control unit controls the acceleration and deceleration of the electric motor according to the mapped speed command and generates regenerative energy according to the deceleration of the electric motor.

17 Claims, 4 Drawing Sheets

(51) Int. Cl.
*B60W 10/08* (2006.01)
*B60W 20/00* (2016.01)
*B60L 7/10* (2006.01)

(52) U.S. Cl.
CPC . *B60W 2510/081* (2013.01); *B60W 2510/082* (2013.01); *B60W 2540/10* (2013.01); *B60W 2710/082* (2013.01); *Y02T 10/7258* (2013.01); *Y10S 903/906* (2013.01)

(58) Field of Classification Search
USPC .......................................................... 701/22
See application file for complete search history.

(56) References Cited

U.S. PATENT DOCUMENTS

| | | | |
|---|---|---|---|
| 6,396,165 B1 * | 5/2002 | Nagano | B60K 6/42 290/40 R |
| 6,565,482 B2 | 5/2003 | Kobayashi et al. | |
| 6,569,055 B2 | 5/2003 | Urasawa et al. | |
| 6,595,898 B2 | 7/2003 | Kobayashi et al. | |
| 7,520,351 B2 | 4/2009 | Uchisasai et al. | |
| 2002/0019295 A1 | 2/2002 | Kobayashi et al. | |
| 2002/0028729 A1 | 3/2002 | Kobayashi et al. | |
| 2002/0094908 A1 | 7/2002 | Urasawa et al. | |
| 2006/0180363 A1 | 8/2006 | Uchisasai et al. | |
| 2008/0185199 A1 * | 8/2008 | Kimura | B60K 6/445 180/242 |
| 2008/0208422 A1 * | 8/2008 | Shibata | B60K 6/365 701/54 |
| 2008/0234915 A1 * | 9/2008 | Nomasa | B60K 6/365 701/102 |
| 2009/0076693 A1 * | 3/2009 | Kumazaki | B60K 6/442 701/55 |
| 2013/0211649 A1 * | 8/2013 | Tashiro | B60H 1/00735 701/22 |
| 2014/0148986 A1 * | 5/2014 | Yoshikawa | B60W 20/10 701/22 |
| 2015/0006000 A1 * | 1/2015 | Kawata | B60K 6/48 701/22 |
| 2015/0159346 A1 | 6/2015 | Kim | |

FOREIGN PATENT DOCUMENTS

| | | |
|---|---|---|
| JP | 2006230101 A | 8/2006 |
| KR | 1020080054531 A | 6/2008 |
| KR | 20100022555 A | 3/2010 |

OTHER PUBLICATIONS

Kim et al., Motor-Generator Control of an Electro-mechanical Variable Transmission for a Hybrid Electric Vehicle, 2006, IEEE, p. 2420-2423.*

Miller et al., Ultracapacitor Enabled Gatekeeper Energy Management Strategy for Single Mode eCVT Hybrid Vehicle Propulsion, 2006, IEEE, p. 1-6.*

Metrakos et al., Strategy for Increasing Hybrid Electric Vehicle Reversibility, 1997, IEEE, p. 694-698.*

International Search Report (in English and Korean) and Written Opinion of the International Searching Authority (in Korean) for PCT/KR2013/008174, mailed Jun. 9, 2014; ISA/KR.

* cited by examiner

METHOD AND DEVICE FOR SENSORY CONTROL OF HYBRID OPERATION MACHINE

CROSS-REFERENCE TO RELATED APPLICATION

This application is a 371 U.S. National Stage of International Application No. PCT/KR2013/008174 filed on Sep. 10, 2013. The entire disclosure of the above application is incorporated herein by reference.

TECHNICAL FIELD

The present invention relates to a method for controlling a hybrid construction machine and the hybrid construction machine controlled by the same. More particularly, the present invention relates to a sensibility control method for precisely controlling the work and the acceleration and deceleration of the traveling of a hybrid construction machine, and to a hybrid construction machine that effectively generates a regenerative energy using the same.

BACKGROUND OF THE INVENTION

Korean Patent Laid-Open Publication No. 10-2008-0054531 discloses a traveling apparatus for a wheel loader. The traveling apparatus includes an acceleration pedal that is provided with a first hall sensor and a second hall sensor, which are disposed at a lower portion thereof and generate a signal for forwardly or backwardly moving the wheel loader, a loader controller that receives the signal generated from the first hall sensor and the second hall sensor of the acceleration pedal and generates a signal to fit each situation in consideration of the current speed and state of the loader, an engine fuel injection controller that receives the signal from the loader controller and controls a fuel injection amount to control the speed, and a forward and backward traveling controller that receives the signal from the loader controller and selects the forward or backward traveling of the loader in response to a value of the received signal. In addition, the loader controller can control the vehicle speed of the loader depending on the speed and time thereof upon the sudden change of the traveling direction.

The Korean Patent Laid-Open Publication No. 10-2008-0054531 discloses that only the acceleration pedal is used to select the forward or backward traveling of the loader to perform a traveling operation, but does not disclose a precise control that is present between the acceleration pedal and the actual traveling operation.

A conventional construction, for example, a wheel loader includes various work modes. All the work modes include a traveling operation. In particular, an acceleration pedal stepping amount determines the speed of the loader during the traveling operation of the loader. For example, a loading work and a carrying work of a dump truck requires a detailed acceleration operation according to a low speed traveling thereof. However, there is a disadvantage in that the detailed operation performed during the low speed traveling thereof depends upon only a skilled operator's feeling. Accordingly, in the case where a detailed traveling operation is repeatedly performed, the operator requires a very high attention, and thus he or she easily feels a fatigue, thereby causing a safety accident. In addition, the conventional construction loader entails a shortcoming in that a traditional mechanical brake used upon the deceleration thereof consumes the kinetic energy of the loader as heat of a brake disc, thereby resulting in a deterioration of energy consumption efficiency.

A conventional construction machine employing an engine encounters the above-mentioned problem, but recently, a hybrid system starts to be applied to a mechanical field, and the development of improvement of fuel efficiency is in progress. The hybrid system is configured to control the electric motor used in the drive of the hybrid system through the electric generator so that kinetic energy of the machine is converted into electric energy which is in turn stored in an energy storage system (ESS). The electric energy stored in the energy storage system (ESS) is re-used for a subsequent work or traveling operation. As such, the hybrid system can improve the fuel efficiency. However, since the drive characteristics of the electric motor are different from that of the engine, sophistication can be reduced during the detailed work. In addition, the conventional hybrid system has a problem in that since it generates regenerative energy using a braking force that is previously set and fixed in the braking operation, there is a limitation in the amount of the regenerative energy generated through the deceleration of the construction machine.

SUMMARY OF THE INVENTION

Accordingly, the present invention has been made to solve the aforementioned problems occurring in the prior art, and it is an object of the present invention to provide an improvement of a sensibility control system for a hybrid construction machine, in which an electric motor is applied to a drive system of the hybrid construction machine so that each shaft can be controlled using the electric motor, unlike a conventional hydraulic construction machine. In accordance with the present invention, sensibility during the acceleration/deceleration of the electric motor can be increased through the mapping of an acceleration pedal command to a speed command of the electric motor so that an operator feels a fine pedaling feeling, thus leading to an increase in convenience and stability of the operator during a detailed work. In addition, a speed gradient is adjusted during the acceleration/deceleration of the electric motor so that sensibility can be increased and at the same time a braking force of a decelerator can be adjusted, thereby maximizing the amount of the regenerative energy. This can further enhance the hybrid effect, thereby maximizing the energy efficiency.

Technical Solution

The present invention is directed to a sensibility control system for a hybrid construction machine. In case of a hybrid construction machine in which an electric motor and a motor drive are used to constitute a traveling system, an acceleration pedal command is the same as a speed command. In other words, the magnitude of the machine speed can be determined depending on a pedal stepping amount (hereinafter, referred to as "acceleration command"), which acts as an important factor for sensibility of acceleration and deceleration of the machine. Therefore, the present invention proposes a hybrid construction machine in which an electric motor 40 is driven by at least one of an electric generator 20 that is driven by an engine 10 and an energy storage system 50 that stores a regenerative energy, and which includes a motor drive 30 configured to drive the electric motor 40, an acceleration sensor 70 configured to sense an acceleration pedal command, and a controller 60 configured to map the acceleration pedal command to a speed command and to control a traveling unit 80 through the motor drive 30 during a low speed traveling operation of the construction machine, wherein the controller 60 controls acceleration/deceleration of the electric motor 40 based on the mapped speed command and generates the regenerative energy in response to the deceleration of the electric motor 40.

Advantageous Effect

The present invention as constructed above can provide a consumer with a hybrid construction machine which increases convenience and safety for a detailed work during a low speed operation through the control of the acceleration/deceleration of the electric motor used in a drive system of a hybrid construction machine, and at the same time maximizes the regenerative energy generated upon the deceleration of the electric motor in a hybrid system to increase energy efficiency.

BRIEF DESCRIPTION OF THE DRAWINGS

The above objects, other features and advantages of the present invention will become more apparent by describing the preferred embodiments thereof with reference to the accompanying drawings, in which.

DETAILED DESCRIPTION OF THE INVENTION

The terms or words used in the specification and the claims of the present invention should not be construed as being typical or dictionary meanings, but should be construed as meanings and concepts conforming to the technical spirit of the present invention on the basis of the principle that an inventor can properly define the concepts of the terms in order to describe his or her invention in the best way.

Hereinafter, preferred embodiments of the present invention will be described in detail with reference to the accompanying drawings.

Figure 2:
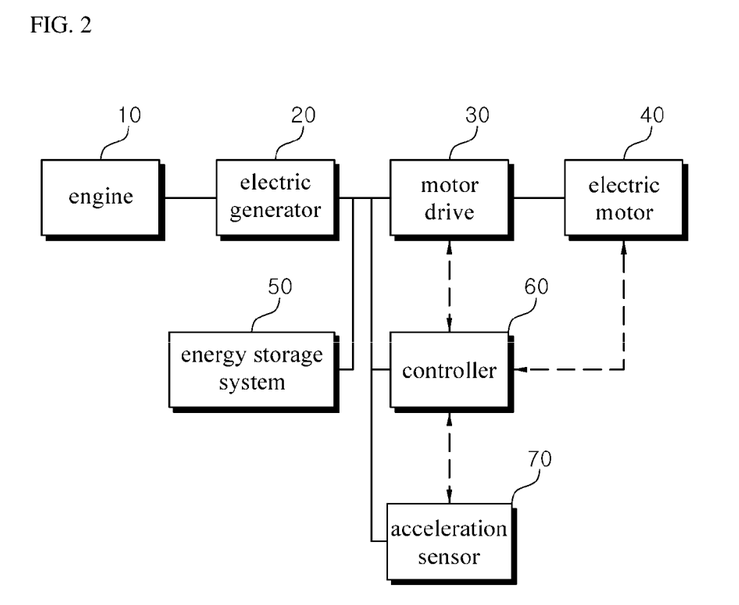
FIG. 2 is a block diagram showing a schematic configuration of a hybrid construction machine in accordance with an embodiment of the present invention.

FIG. 2 is a block diagram showing a schematic configuration of a hybrid construction machine in accordance with an embodiment of the present invention.

The construction machine of the present invention uses a hybrid system as a power source. The drive mechanism of the hybrid system is as follows. An engine 10 is driven to cause an electric generator 20 to produce electric energy. The produced electric energy drives an electric motor to perform a work or a traveling operation of the construction machine. In this case, regenerative energy is generated by the regenerative braking of the electric motor upon the deceleration of the electric motor during the work or the traveling operation of the construction machine. The generated regenerative energy is stored in an energy storage system (ESS), and is used for a subsequent work or traveling operation of the construction machine. The energy flow of the hybrid system may be changed depending on the conditions of a sub-system. For example, the electric energy produced by the electric generator may be directly transferred to the electric motor, or may be stored in the energy storage system and transferred to the electric motor, if necessary.

MODE FOR CARRYING OUT INVENTION

The regenerative energy means energy that is temporarily accumulated in the form of other types of energy form converted from kinetic energy which a vehicle possesses during the traveling thereof upon the deceleration of the electric motor using a regenerative brake and is re-used upon the oscillation or acceleration of the machine.

The examples of the form of the energy accumulated as the regenerative energy include kinetic energy of a fly wheel or accumulative energy of an accumulator. Generally, a drive motor for traveling of a vehicle or a construction machine is used. The drive motor for traveling is operated by the electric generator upon the deceleration of the electric motor during the traveling operation of the work of the construction machine so that electric power produced at the operation of the drive motor is accumulated in the energy storage system.

The regenerative energy will be described with reference to an example of a hybrid system used in a vehicle. An electric motor of the vehicle is also used as an electric generator, and generates power output to assist an engine. The electric motor is rotated to generate electricity in cooperation with a drive shaft during the braking operation. In this case, the braking operation of the vehicle is achieved by the rotation resistance of the motor. However, since an existing hybrid technology has a limitation in decreasing a great deal of instantaneous kinetic energy generated upon a sudden stepping on a brake pedal through the rotation of the motor, a much stronger braking force is provided by through the intervention of a disc brake of the vehicle upon the sudden stepping on the brake pedal. At this time, a considerable energy loss occurs. Resultantly, a degree of energy loss varies depending on a degree of smoothness of the braking operation. Due to this principle, almost all existing hybrid vehicles can use the kinetic energy of the vehicle to recharge a battery only through a slow braking operation. If the vehicle operator performs a sudden braking operation using a hydraulic brake (i.e., disc brake), most of braking energy will be lost as heat through the disc brake, and the regenerative energy stored in the electric motor will be extremely limited.

As described above, the regenerative energy is generated upon the deceleration of the vehicle, and thus a brake pedal for deceleration of the vehicle is mainly used as a regenerative brake. In the case where the brake pedal of the vehicle is used as the regenerative brake, a vehicle brake requires a deceleration rate of a maximum of 1G or so. Thus, since the regenerative brake has a limitation in the capacity of a motor, an inverter or a secondary battery, a hydraulic brake is also auxiliarily used together with the regenerative brake so as to generate a strong braking force. The charging of electric energy in the energy storage system may be performed even during a braking operation and a downhill traveling operation. The charged energy is re-used as electricity during an uphill traveling operation to drive the electric motor so that energy can be saved. As a consequence, the generation of the regenerative energy by the regenerative braking can improve the overall fuel efficiency of the vehicle and extend the lifespan of brake components.

The present invention proposes a hybrid construction machine in which an operator performs a regenerative braking operation of the vehicle using an acceleration pedal to generate regenerative energy which will be used for a subsequent work. The acceleration pedal is used to control a traveling torque during the traveling of the vehicle, but attention must be paid to the fact that the operator can operate the acceleration pedal similarly to the regenerative brake in a state of loosely or completely stepping on the acceleration pedal. This is the same as a principle in which a deceleration force is generated as in an engine brake of an internal combustion engine vehicle. The use of the engine brake of the existing internal combustion engine vehicle as a regenerative brake does not separately require a sensor or an actuator for adjusting a hydraulic brake so as to operate the regenerative brake. For this reason, a simple structure can be maintained, but a large braking force (i.e., regenerative brake) cannot be installed at the electric motor, making it impossible to increase the recovery rate of energy generated during the braking operation.

It can be contemplated that the acceleration of the vehicle varies depending on a degree of stepping on the acceleration pedal by the operator, and the acceleration of the vehicle is controlled based on a gradient of the acceleration. If it is contemplated inversely to the above contemplation, the deceleration of the vehicle may be controlled depending on a degree of detaching from the acceleration pedal by the operator. This means that a braking force varies depending on a deceleration gradient (i.e., acceleration pedal manipulation amount).

The construction machine or vehicle according to the present invention proposes an apparatus and a method which can adjust sensitivity of the acceleration pedal to increase a precision of the vehicle manipulation during a low speed traveling operation or a low speed working operation, and can use the acceleration pedal similarly to the regenerative brake to increase the amount of regenerative energy generated.

Figure 1:
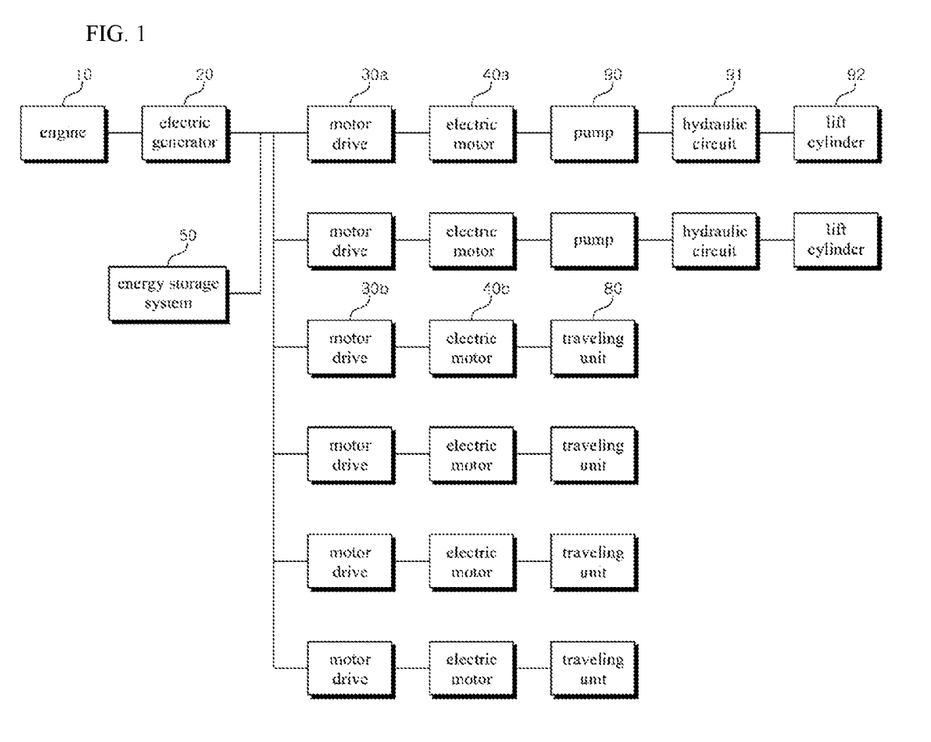
FIG. 1 is a block diagram showing a concept of a hybrid construction machine system in accordance with an embodiment of the present invention.

FIG. 1 is a block diagram showing a concept of a hybrid construction machine system in accordance with an embodiment of the present invention.

As shown in FIG. 1, a hybrid construction machine system includes an engine 10, an electric generator 20, motor drives 30a and 30b, electric motors 40a and 40b, an energy storage system 50, a traveling unit 80, a pump 90, a hydraulic circuit 91, and a lift cylinder 92. A single construction machine includes a plurality of hydraulic circuits 91, a plurality of pumps 90, a plurality of electric motors 40a, and a plurality of motor drives 30a to operate a plurality of lift cylinders 92, and includes a plurality of electric motors 40b and a plurality of motor drives 30b to drive a plurality of traveling units 80.

The traveling unit 80 serves to perform a movement, a stop, and a direction change of the construction machine. The examples of the traveling unit may include a vehicular wheels or caterpillar, etc. The traveling unit 80 may be driven by the electric motor and the electric motor 40b is controlled by the motor drive 30b. The motor drive (or motor driver) is a constituent element that includes a controller for controlling a power conversion function for driving the electric motor, and a speed and torque of the motor, and serves to precisely control the rotation speed of the motor, etc. The motor drive is a sort of module that receives various kinds of sensor values associated with the motion of the motor to control the motor, and also serves to control the drive operations such as forward rotation, reverse rotation, acceleration, deceleration, and stop of the motor.

A work is performed by the movement of the lift cylinder 92, and the lift cylinder 92 is driven by the operation of the hydraulic circuit 91. The hydraulic circuit 91 is operated by hydraulic fluid supplied by actuating the pump 90, and the electric motor 40a is driven by the motor drive 30a.

Figure 3:
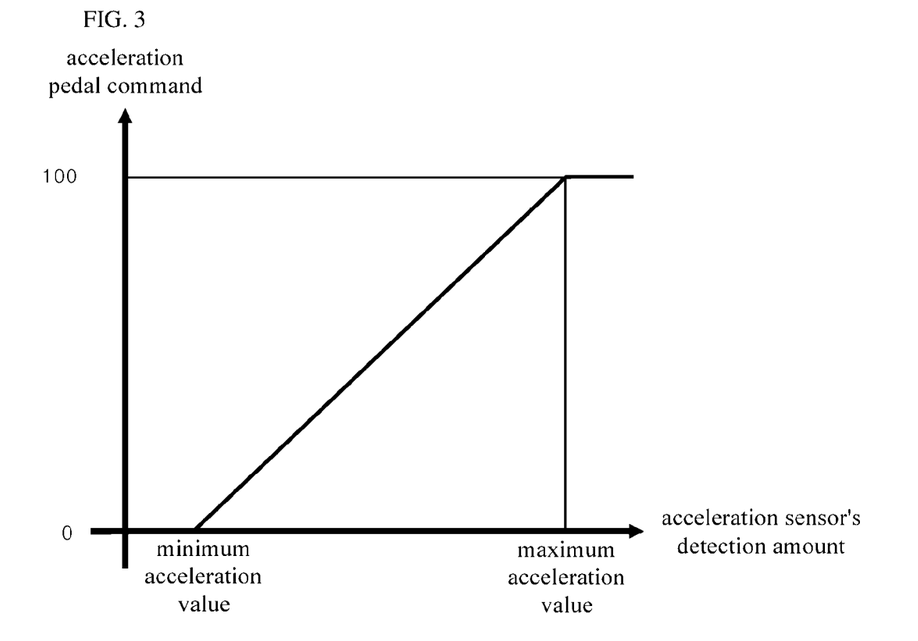
FIG. 3 is a graph showing the mapping of a manipulation amount of an acceleration pedal, which is sensed by an acceleration sensor, to an acceleration pedal command in accordance with an embodiment of the present invention.

FIG. 3 is a graph showing the mapping of a manipulation amount of an acceleration pedal, which is sensed by an acceleration sensor, to an acceleration pedal command in accordance with an embodiment of the present invention.

The acceleration sensor 70 serves to sense an acceleration pedal command transmitted to the acceleration pedal by an operator. As shown in FIG. 3, The reason of not using, as it is, a value inputted to the acceleration sensor, but converting (mapping) the value into an acceleration pedal command is that a minimum value and a maximum value of the value of the acceleration sensor contains an error depending on the sensors. In addition, all the linear sections of the acceleration sensor may differ depending on the kind of the sensor. For this reason, if there is no compensation of such a difference, all the programs need to be corrected according to each sensor, leading to a decrease in versatility of the machine. In order to solve this problem, as shown in FIG. 3, the minimum and maximum acceleration values are set which ensures the linearity of the sensor, and the acceleration pedal command is set to 0 to 100% based on the set minimum and maximum acceleration values. This is merely an illustrative example, and the minimum and maximum acceleration values may be set to fit the traveling conditions and work environments through an external device such as an instrument panel of the construction machine or a notebook computer.

FIG. 3 shows an example of how the acceleration pedal command is detected by the acceleration sensor. If a command of the operator which is detected by the acceleration sensor 70 is lower than a point of the minimum acceleration value, the acceleration pedal command is set to "0", and if the command of the operator which is detected by the acceleration sensor 70 is higher than the point of the minimum acceleration value and is lower than a point of the maximum acceleration value, the acceleration pedal command is set to have a constant gradient. On the contrary, if the command of the operator which is detected by the acceleration sensor 70 is higher than the point of the maximum acceleration value, the acceleration pedal command is set to have a constant vale. This is an example in which the acceleration pedal command is sensed, and the minimum and maximum acceleration values inputted to the acceleration sensor may be set in various manners depending on the traveling conditions and work environments. In addition, although it has been described in FIG. 3 that a gradient of the acceleration pedal command is set linearly, it may be set nonlinearly.

Figure 4:
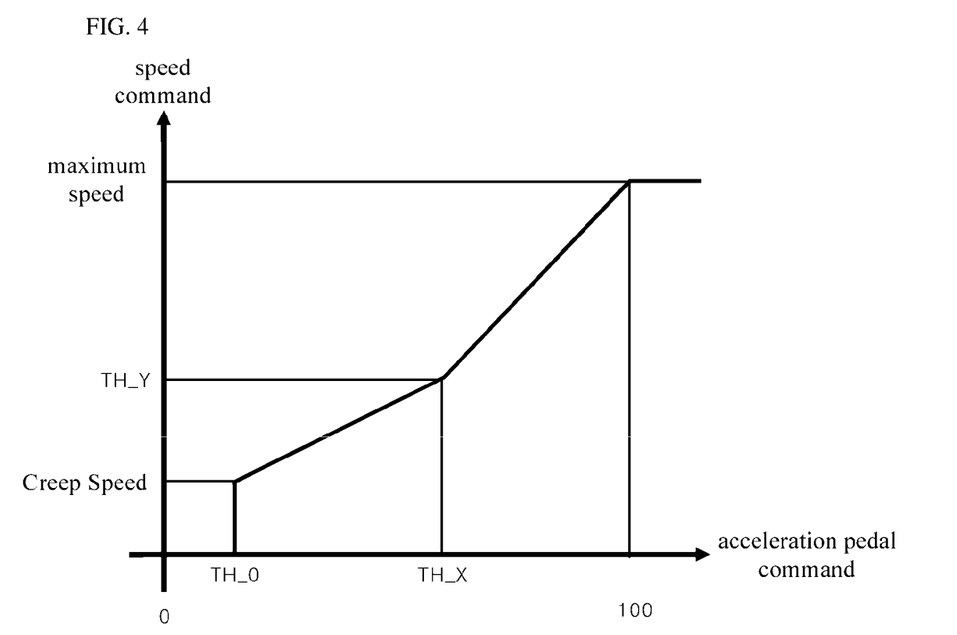
FIG. 4 is a graph showing the mapping of an acceleration pedal command to a speed command in accordance with an embodiment of the present invention.

FIG. 4 is a graph showing the mapping of an acceleration pedal command to a speed command in accordance with an embodiment of the present invention.

The controller 60 is a constituent element that maps an acceleration pedal command to a speed command and controls the traveling unit 80 through the motor drive 30 during a low speed traveling operation of the construction machine. The controller 60 may be implemented as a microcomputer, an ECU, an electronic controller, an integrated circuit (IC), or the like. The controller 60 receives an acceleration pedal command from the acceleration sensor 70 and maps the received acceleration pedal command to the speed command.

The magnitude of the speed command is determined in proportion to that of the acceleration pedal command. A method of mapping the acceleration pedal command to the speed command acts on an important factor for determining a pedaling feeling and affects a traveling quality and a work precision of the operator.

When the acceleration pedal command is increased instantaneously, the speed command is required not to be increased instantaneously accordingly but to be increased or decreased while having a constant gradient. This acts as an important factor for sensibility of acceleration and deceleration of the vehicle.

First, the mapping between the acceleration pedal command and the speed command can be linearly performed. This means that the acceleration pedal command and the speed command are mapped to each other at a ratio of 1:1, and the speed command increases in proportion to an increase in the acceleration pedal command.

Second, the mapping between the acceleration pedal command and the speed command can be nonlinearly performed. For example, as shown in FIG. 4, the acceleration pedal command and the speed command can be mapped to each other in the form of a two-staged curve. As described above, since an operator requires a fine pedaling feeling during a low speed work, an increase amount of the speed command is made slightly smaller than that of the acceleration pedal command to increase convenience during a low speed detailed work. To this end, the mapping between the acceleration pedal command and the speed command can be nonlinearly performed while forming at least one inflection point between the maximum acceleration value and the minimum acceleration value. In FIG. 4, one inflection point (i.e., a coordinate: (TH_X, TH_Y)) is formed upon the mapping so that the mapping between the acceleration pedal command and the speed command is configured in the form of a two-staged structure. The acceleration pedal command is mapped to the speed command below the inflection point (TH_X, TH_Y). This mapping can increase a precision of the construction machine during a low speed traveling operation and a low speed work. Besides, the regenerative braking operation of the electric motor can be performed more efficiently, and thus the regenerative energy can be generated.

In addition, the hybrid construction machine of the present invention can adjust the regenerative energy generated during the deceleration of the electric motor using a preset speed gradient during the control of the acceleration/deceleration of the electric motor based on the mapped speed command. In other words, the use of the electric braking operation according to the present invention can change a reduction gradient of the speed command according to a braking mode so that braking forces by each mode can be set differently. Thus, this means that when the braking forces are substituted into the law of acceleration, the amount of the regenerative energy generated can be controlled. The generated regenerative energy is stored in the energy storage system, and the stored regenerative energy can be used for a subsequent work or traveling operation.

In FIG. 4, the creep speed refers to the lowest speed of the electric motor at a time point (TH_0) where the acceleration pedal command is recognized. By virtue of this, the lowest speed of the electric motor can be controlled. Correspondingly, when the acceleration pedal command is inputted maximally, the speed command can also be set to the maximum speed. In this case, the time point (TH_0) where the acceleration pedal command is recognized, the creep speed, and the maximum speed may be set in various manners depending on the traveling conditions and work environments.

Figure 5:
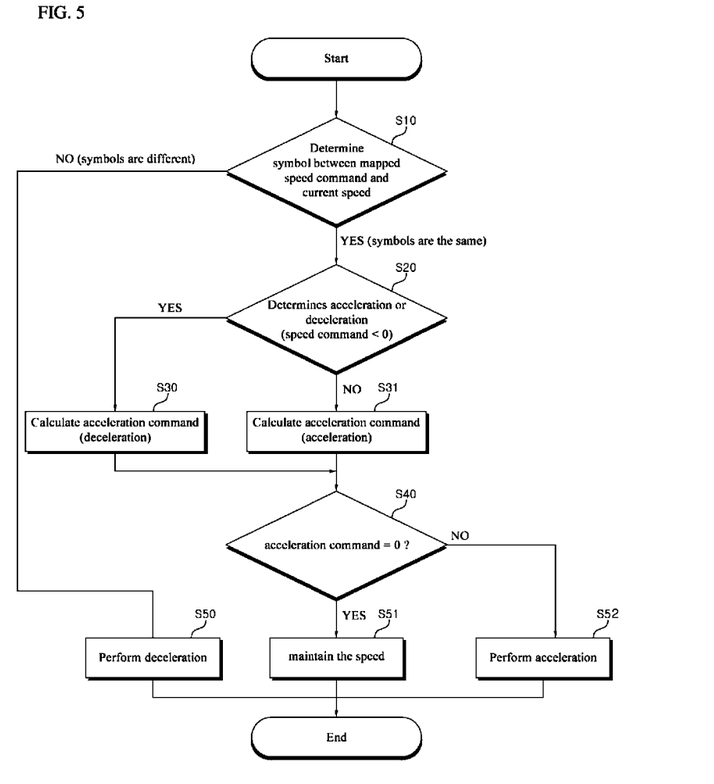
FIG. 5 is a block diagram showing the implementation of a command in accordance with an embodiment of the present invention.

FIG. 5 is a block diagram showing the implementation of a command in accordance with an embodiment of the present invention.

FIG. 5 shows an example of how the speed of the construction machine is changed through the acceleration pedal command. The acceleration and deceleration of the construction machine can be controlled through the implementation of a command. When a user manipulates the acceleration pedal of the construction machine, an acceleration command is inputted by the acceleration sensor, and is mapped to a speed command by the controller. At this time, the controller compares (or determines) a symbol between the mapped speed command and a current speed (S10).

If it is determined at step S10 that a symbol of the mapped speed command is different from that of the current speed, the program proceeds to step S50 where the controller performs deceleration such that the speed of the construction machine is decelerated. On the other hand, if it is determined at step S10 that a symbol of the mapped speed command is the same as that of the current speed, the program proceeds to step S20 where the controller determines whether to accelerate or decelerate the speed of the construction machine.

If it is determined at step S20 that the speed command is smaller than "0", the program proceeds to step S30 where the controller calculates the acceleration command. In this case, the acceleration command is calculated as follows:

"Acceleration command=|speed command|+current speed".

On the contrary, if it is determined at step S20 that the speed command is larger than or equal to "0", the program proceeds to step S31 where the controller calculates the acceleration command as follows:

"Acceleration command=speed command−current speed".

Subsequently, if it is determined at step S40 that the acceleration command is equal to 0, the program proceeds to step S51 where the controller controls the speed of the construction machine to be maintained. On the contrary, if it is determined at step S40 that the acceleration command is not equal to 0, the program proceeds to step S52 where the controller perform acceleration such that the speed of the construction machine is accelerated.

The construction machine according to the present invention enables the traveling operation or the work to be accelerated or decelerated by the above-mentioned flow chart. If the speed command increases the speed of the construction machine, the speed is increased by a preset gradient. On the contrary, the speed command decreases the speed of the construction machine, the speed is decreased by the preset gradient. Resultantly, the operation of the acceleration pedal is similar to that of the regenerative brake. For this reason, if the operator loosely steps on the acceleration pedal during the traveling operation or the work of the construction machine, the speed of the construction machine is reduced by the preset gradient. In other words, a phenomenon occurs in which the brake is latched, and the regenerative energy is generated from the electric motor. By virtue of this mechanism, the present invention facilitates the speed control of the construction machine during a low speed traveling operation or a low speed work, and enables the regenerative braking of the electric motor to be performed more efficiently, and thus the regenerative energy can be generated more efficiently.

Such a hybrid construction machine can be driven by the following method corresponding to the apparatus. In a method for controlling a hybrid construction machine, an electric motor is operated by at least one of an electric generator that is driven by an engine and an energy storage system that stores regenerative energy, and the method includes the steps of: allowing an acceleration sensor to sense an acceleration pedal command; allowing a controller to map the acceleration pedal command to a speed command during a low speed traveling operation of the construction machine; allowing the controller to control acceleration/deceleration of the electric motor based on the mapped speed command; and allowing the controller to generate the regenerative energy in response to the deceleration of the electric motor.

INDUSTRIAL APPLICABILITY

The present invention as constructed above can provide a hybrid construction machine which increases convenience and safety for a detailed work during a low speed operation through the control of the acceleration/deceleration of the electric motor used in a drive system of a hybrid construction machine and at the same time maximizes the regenerative energy generated upon the deceleration of the electric motor in a hybrid system to increase energy efficiency.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

The invention claimed is:

1. A hybrid construction machine in which an electric motor is operated by at least one of an electric generator that is driven by an engine and an energy storage system that stores regenerative energy, the hybrid construction machine comprising:
a motor drive configured to drive the electric motor;
an acceleration sensor configured to sense an acceleration pedal command; and
a controller configured to map the acceleration pedal command to a speed command and to control a traveling unit through the motor drive during a low speed traveling operation of the machine,
wherein the controller controls acceleration/deceleration of the electric motor based on the mapped speed command, and generates the regenerative energy in response to the deceleration of the electric motor.

2. The hybrid construction machine according to claim 1, wherein if it is required to perform a precise acceleration/deceleration control of the electric motor during the low speed traveling operation of the construction machine, the controller sets a minimum acceleration value and a maximum acceleration value which are sensed by the acceleration sensor, performs a linear mapping of the acceleration pedal command to the speed command between the minimum acceleration and the maximum acceleration, and controls the acceleration/deceleration of the electric motor based on the mapped speed command.

3. The hybrid construction machine according to claim 1, wherein if it is required to perform a precise acceleration/deceleration control of the electric motor during the low speed traveling operation of the construction machine, the controller sets a minimum acceleration value and a maximum acceleration value which are sensed by the acceleration sensor, maps the speed command to "0" if the acceleration pedal command is lower than a threshold value, maps the speed command to a predetermined creep speed if the acceleration pedal command is equal to the threshold value, maps the speed command to the maximum value of the acceleration pedal command if the acceleration pedal command exceeds the threshold value, and controls the acceleration/deceleration of the electric motor based on the mapped speed command.

4. The hybrid construction machine according to claim 3, wherein if the acceleration pedal command exceeds the threshold value and the speed command is mapped to the maximum value of the acceleration pedal command, the controller maps the speed command to the acceleration pedal command while forming at least one inflection point, and controls the acceleration/deceleration of the electric motor based on the mapped speed command.

5. The hybrid construction machine according to claim 1, wherein when the controller controls the acceleration/deceleration of the electric motor based on the mapped speed command, the controller adjusts the regenerative energy that is generated during the deceleration using a preset speed gradient.

6. The hybrid construction machine according to claim 1, wherein the generated regenerative energy is stored in the energy storage system, and the stored regenerative energy is used for a subsequent work.

7. A method for controlling a hybrid construction machine in which an electric motor is operated by at least one of an electric generator that is driven by an engine and an energy storage system that stores regenerative energy, the method comprising the steps of:
allowing an acceleration sensor to sense an acceleration pedal command;
allowing a controller to map the acceleration pedal command to a speed command during a low speed traveling operation of the construction machine;
allowing the controller to control acceleration/deceleration of the electric motor based on the mapped speed command; and
allowing the controller to generate the regenerative energy in response to the deceleration of the electric motor.

8. The method for controlling a hybrid construction machine according to claim 7, further comprising the steps of:
allowing the controller to set a minimum acceleration value and a maximum acceleration value which are sensed by the acceleration sensor; and
allowing the controller to linearly map the acceleration pedal command to the speed command between the minimum acceleration value and the maximum acceleration value, and control the acceleration/deceleration of the electric motor based on the mapped speed command.

9. The method for controlling a hybrid construction machine according to claim 7, further comprising a step of allowing the controller to set a minimum acceleration value and a maximum acceleration value which are sensed by the acceleration sensor, map the speed command to "0" if the acceleration pedal command is lower than a threshold value, map the speed command to a predetermined creep speed if the acceleration pedal command is equal to the threshold value, map the speed command to the maximum value of the acceleration pedal command if the acceleration pedal command exceeds the threshold value, and control the acceleration/deceleration of the electric motor based on the mapped speed command.

10. The method for controlling the hybrid construction machine according to claim 9, further comprising a step of allowing, if the acceleration pedal command exceeds the threshold value and the speed command is mapped to the maximum value of the acceleration pedal command, the controller to map the speed command to the acceleration pedal command while forming at least one inflection point, and control the acceleration/deceleration of the electric motor based on the mapped speed command.

11. The method for controlling a hybrid construction machine according to claim 7, wherein the generated regenerative energy is stored in the energy storage system, and the stored regenerative energy is used for a subsequent work.

12. The hybrid construction machine according to claim 2, wherein when the controller controls the acceleration/deceleration of the electric motor based on the mapped speed command, the controller adjusts the regenerative energy that is generated during the deceleration using a preset speed gradient.

13. The hybrid construction machine according to claim 3, wherein when the controller controls the acceleration/deceleration of the electric motor based on the mapped speed command, the controller adjusts the regenerative energy that is generated during the deceleration using a preset speed gradient.

14. The hybrid construction machine according to claim 4, wherein when the controller controls the acceleration/deceleration of the electric motor based on the mapped speed command, the controller adjusts the regenerative energy that is generated during the deceleration using a preset speed gradient.

15. The method for controlling a hybrid construction machine according to claim 8, wherein the generated regenerative energy is stored in the energy storage system, and the stored regenerative energy is used for a subsequent work.

16. The method for controlling a hybrid construction machine according to claim 9, wherein the generated regenerative energy is stored in the energy storage system, and the stored regenerative energy is used for a subsequent work.

17. The method for controlling a hybrid construction machine according to claim 10, wherein the generated regenerative energy is stored in the energy storage system, and the stored regenerative energy is used for a subsequent work.

* * * * *